United States Patent
Brinkley et al.

(10) Patent No.: US 12,153,324 B2
(45) Date of Patent: Nov. 26, 2024

(54) OPTICAL PHASED ARRAY ARCHITECTURE FOR WAVEFRONT SENSING

(71) Applicant: X DEVELOPMENT LLC, Mountain View, CA (US)

(72) Inventors: Devin Brinkley, Redwood City, CA (US); Baris Ibrahim Erkmen, Sunnyvale, CA (US); Joaquin Matres Abril, Palo Alto, CA (US); Paul Epp, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 159 days.

(21) Appl. No.: 17/897,410

(22) Filed: Aug. 29, 2022

(65) Prior Publication Data

US 2023/0100620 A1 Mar. 30, 2023

Related U.S. Application Data

(60) Provisional application No. 63/246,605, filed on Sep. 21, 2021.

(51) Int. Cl.
*H04B 10/25* (2013.01)
*G02B 6/124* (2006.01)
(Continued)

(52) U.S. Cl.
CPC .......... *G02F 1/2955* (2013.01); *G02B 6/124* (2013.01); *H04B 10/548* (2013.01); *G02B 2006/12147* (2013.01); *G02B 2006/12159* (2013.01)

(58) Field of Classification Search
CPC ......... G02F 1/2955; G02F 1/10; G02B 6/124; G02B 2006/12147; G02B 2006/12159; H04B 10/25; H04B 10/548
See application file for complete search history.

(56) References Cited

U.S. PATENT DOCUMENTS

| | | | |
|---|---|---|---|
| 5,479,539 A | 12/1995 | Goldsmith et al. |
| 5,543,805 A | 8/1996 | Thaniyavarn |

(Continued)

FOREIGN PATENT DOCUMENTS

| | | | |
|---|---|---|---|
| CN | 110572210 A | 12/2019 |
| CN | 111487602 A | 8/2020 |

(Continued)

OTHER PUBLICATIONS

International Search Report and Written Opinion for Application No. PCT/US2022/032348 dated Sep. 29, 2022 (11 pages).

(Continued)

*Primary Examiner* — Tanya T Motsinger
(74) *Attorney, Agent, or Firm* — Botos Churchill IP Law

(57) ABSTRACT

An optical phased array (OPA) photonic integrated chip includes a plurality of array elements, a plurality of phase shifters, a plurality of combiners, and an edge coupler configured to couple to a single mode waveguide. The plurality of phase shifters includes a layer of phase shifters that has a phase shifter connected to each array element in the plurality of array elements. The plurality of combiners is configured to connect the plurality of phase shifters to the edge coupler. The plurality of combiners includes a first combiner that has a first output that is connected to a second combiner or the edge coupler, and a second output of the first combiner is connected to a photodetector. An in-phase light portion at the first combiner is output through the first output, and an out-of-phase light portion at the first combiner is output through the second output.

20 Claims, 5 Drawing Sheets

(51) Int. Cl.
    *G02F 1/295*     (2006.01)
    *H04B 10/548*     (2013.01)
    *G02B 6/12*     (2006.01)

(56) References Cited

U.S. PATENT DOCUMENTS

| | | | |
|---|---|---|---|
| 6,741,207 B1 * | 5/2004 | Allison | H01P 1/184 |
| | | | 333/164 |
| 6,978,093 B2 | 12/2005 | Clark | |
| 8,605,761 B2 | 12/2013 | Hutchin | |
| 9,683,928 B2 | 6/2017 | Swanson | |
| 9,948,377 B1 * | 4/2018 | Kim | H04B 14/006 |
| 10,545,289 B1 | 1/2020 | Chriqui et al. | |
| 10,678,117 B2 | 6/2020 | Shin et al. | |
| 11,003,045 B2 | 5/2021 | Hosseini et al. | |
| 2013/0202303 A1 | 8/2013 | Wilkinson | H04L 27/3818 |
| | | | 398/76 |
| 2017/0237500 A1 | 8/2017 | Nishimoto | |
| 2017/0357142 A1 | 12/2017 | Spector et al. | |
| 2018/0039153 A1 | 2/2018 | Hashemi et al. | |
| 2018/0102847 A1 | 4/2018 | Kim et al. | |
| 2018/0123699 A1 * | 5/2018 | Fatemi | H04B 10/613 |
| 2018/0321569 A1 | 11/2018 | Spector et al. | |
| 2018/0359019 A1 * | 12/2018 | Han | H03D 7/1466 |
| 2019/0310422 A1 * | 10/2019 | Seyedi | H01S 5/021 |
| 2019/0391243 A1 * | 12/2019 | Nicolaescu | G01S 17/42 |
| 2020/0192179 A1 * | 6/2020 | Hajimiri | G02B 6/29313 |
| 2020/0280373 A1 * | 9/2020 | Palmer | H04B 10/40 |
| 2020/0319524 A1 * | 10/2020 | Hosseini | G02B 27/48 |
| 2020/0393737 A1 * | 12/2020 | Hosseini | G02F 1/225 |
| 2021/0072384 A1 * | 3/2021 | Margallo | G01S 7/4863 |
| 2021/0103199 A1 | 4/2021 | Wu et al. | |
| 2021/0152243 A1 | 5/2021 | Hosseini et al. | |
| 2021/0344170 A1 * | 11/2021 | Komljenovic | H01S 3/0014 |
| 2022/0006530 A1 * | 1/2022 | Ngo | H04B 10/40 |
| 2022/0146903 A1 | 5/2022 | Watts et al. | |
| 2022/0155608 A1 * | 5/2022 | Phare | G02B 5/10 |
| 2022/0252908 A1 | 8/2022 | Inamdar et al. | |
| 2023/0088334 A1 * | 3/2023 | Erkmen | G01S 7/4817 |
| | | | 398/208 |
| 2023/0100620 A1 * | 3/2023 | Brinkley | H04B 10/548 |
| | | | 398/183 |
| 2023/0282977 A1 * | 9/2023 | Mesquita | H03H 7/20 |
| | | | 342/368 |

FOREIGN PATENT DOCUMENTS

| | | | |
|---|---|---|---|
| CN | 112034657 A | | 12/2020 |
| JP | H08172215 A | | 7/1996 |
| JP | 2017147622 A | | 8/2017 |
| WO | 2019026207 A1 | | 2/2019 |
| WO | 2019207756 A1 | | 10/2019 |
| WO | WO-2024116124 A1 * | | 6/2024 |

OTHER PUBLICATIONS

International Search Report and Written Opinion for Application No. PCT/US2022/042025 dated Dec. 9, 2022 (14 pages).

Abediasl, Hooman, et al., "Monolithic optical phased-array transceiver in a standard SOI CMOS process" Optics Express, vol. 23, No. 5, Mar. 2, 2015, p. 6509, XP055497279, DOI: 10.1364/OE.23.006509.

Bazil Raj, Arockia A, et al., "Intensity feedback-based beam wandering mitigation in free-space optical communication using neural control technique", EURASIP Journal on Wireless Communications and Networking 2014, 160 (2014).

Doylend, J. K., et al., "Two-dimensional free-space beam steering with an optical phased array on silicon-on-insulator", Optical Society of America. 2011.

Guo, Yongjun, et al., "Integrated Optical Phased Arrays for Beam Forming and Steering.", Appl. Sci. 2021, 11, 4017. https://doi.org/10.3390/app11094017, pp. 1-41.

Hahn, Daniel V., et al., The Johns Hopkins APL Technical Digest, vol. 30, No. 4., 2012, 321-330.

Kwong, David, et al., "On-chip silicon optical phased array for two-dimensional beam steering", Optics letters 39 4 (2014): 941-4.

Leitgeb, E., et al., "Optical networks, last mile access and applications", Journal of Optical Fiber Communications Reports 2, Springer Science+Business Media Inc., 2005, 56-85.

Liu, Yaqi, et al., "A single-chip multi-beam steering optical phased array: design rules and simulations", Optics Express vol. 29, Issue 5, pp. 7049-7059 (2021).

Ramasarma, Vaidyanathan, "Free Space Optics: A Viable Last-Mile Solution", Bechtel Telecommunications Technical Journal, vol. 1, No. 1., Dec. 2002, 1-9.

Stepanova, Daria, et al., "Developing A Highly Accurate Pointing System for Free Space optical Communications", Journal of Communications vol. 14, No. 12, Dec. 2019.

Wang, Pengfei, et al., "Design and fabrication of a SiN—Si dual-layer optical phased array chip", Photonics Research vol. 8, No. 6, pp. 912-919 (Jun. 2020).

Zhang, Haiyang, et al., "Fast beam steering enabled by a chip-scale optical phased array with 8×8 elements", Optics Communications, vol. 461, 2020, 125267, ISSN 0030-4018.

Notice of Reasons for Rejection for Japanese Patent Application No. 2024-517509, Oct. 8, 2024, 12 Pages.

The First Chinese Office Action for Chinese Patent Application No. 2022800710821, Sep. 25, 2024, 17 Pages.

* cited by examiner

OPTICAL PHASED ARRAY ARCHITECTURE FOR WAVEFRONT SENSING

CROSS-REFERENCE TO RELATED APPLICATIONS

This application claims the benefit of the filing date of U.S. Provisional Application No. 63/246,605, filed Sep. 21, 2021, the entire disclosure of which is incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to the terminal aperture at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits on adaptive-optics, point-to-multipoint support, and mesh network topologies. Each active element in the OPA requires electro-optic phase shifting capability.

BRIEF SUMMARY

Aspects of the disclosure provide for an optical phased array (OPA) photonic integrated chip. The OPA chip includes a plurality of array elements; a plurality of phase shifters including a layer of phase shifters that has a phase shifter connected to each array element in the plurality of array elements; a plurality of combiners that is configured to connect the plurality of phase shifters to an edge coupler for a single mode waveguide, the plurality of combiners including a first combiner that has a first output that is connected to a second combiner or the edge coupler, and a second output of the first combiner is connected to a photodetector, wherein an in-phase light portion at the first combiner is output through the first output, and an out-of-phase light portion at the first combiner is output through the second output; and the edge coupler configured to couple to the single mode waveguide.

In one example, the plurality of array elements includes a grating emitter. In another example, the plurality of array elements is arranged in a 32×32 grid of array elements. In a further example, the plurality of combiners includes at least one 2×2 multimode interferometer (MMI). In yet another example, the plurality of combiners includes at least one directional coupler. In a still further example, the plurality of combiners is arranged in an H tree configuration. In another example, the plurality of combiners includes more than one combiner that has an output connected to a photodetector.

In a further example, the plurality of array elements and the plurality of phase shifters are arranged in silicon, and the edge coupler is arranged in silicon nitride. In this example, a first set of the plurality of combiners is arranged in silicon, and a second set of the plurality of combiners is arranged in silicon nitride. In yet another example, the OPA chip also includes a micro-lens array arranged between the plurality of array elements and an edge of the OPA chip.

In a still further example, an optical communication system includes the OPA chip. In this example, the optical communication system also includes one or more processors configured to transmit a first optical signal via the OPA chip and receive a second optical signal via the OPA chip. Also in this example, the one or more processors are configured to receive a signal from the photodetector; determine an adjustment to at least one phase shifter of the plurality of phase shifters in order to increase an amount of incoming light coupled to the OPA chip; and send instructions to the at least one phase shifter to perform the adjustment. Additionally or alternatively in this example, the first optical signal and the second optical signal have a wavelength separation equal to or larger than 100 GHz.

Other aspects of the disclosure provide for a method for performing wavefront correction for optical communication. The method includes receiving, at an optical phased array on a photonic integrated chip in a communication system, an incoming optical communication beam; receiving, at a combiner of the photonic integrated chip, a first beam portion of the incoming optical communication beam and a second beam portion of the incoming optical communication beam: combining, at the combiner, the first beam portion and the second beam portion into an output beam; outputting, from the combiner, a first output beam portion towards an edge coupler of the photonic integrated chip, the first output beam portion being an in-phase portion of the output beam: outputting, from the combiner, a second output beam portion to a photodetector, the second output beam portion being an out-of-phase portion of the output beam; detecting, by one or more processors of the communication system, a measurement of the second output beam portion from the photodetector; determining, by the one or more processors, a wavefront error of the incoming optical communication beam based on the measurement; and adjusting, by the one or more processors, at least one phase shifter of the communication system based on the determined wavefront error In one example, the determining of the wavefront error includes determining a relative phase difference based on the measurement. In another example, the method also includes transmitting, by the one or more processors, an outgoing optical communication beam using the photonic integrated chip and the adjusted at least one phase shifter. In this example, the detecting of the measurement, the determining of the wavefront error, and the adjusting of the at least one phase shifter comprise a feedback loop. Further in this example, the method also includes tracking, using the feedback loop, changes of the incoming optical communication beam. In a further example, the adjusting of the at least one phase shifter includes increasing the in-phase portion of the output beam and decreasing the out-of-phase portion of the output beam at the combiner.

DETAILED DESCRIPTION

Overview

Figure 1:
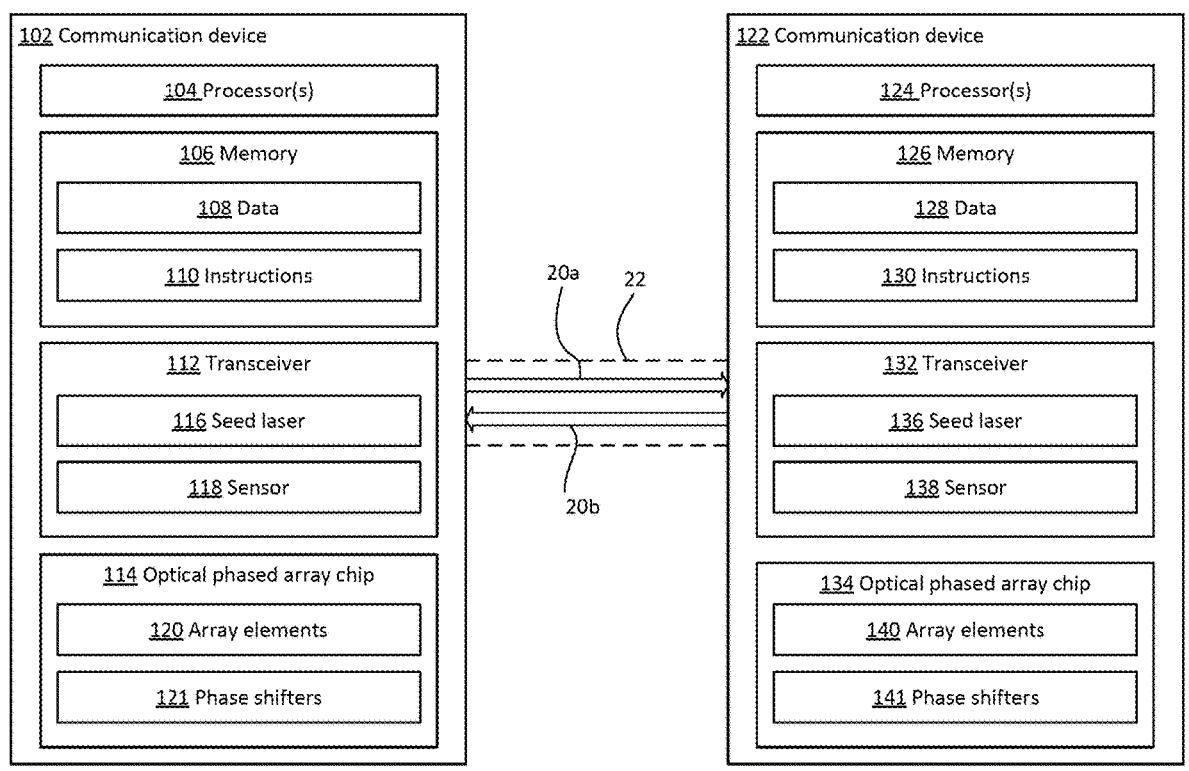
FIG. 1 is a block diagram of a first communication device and a second communication device in accordance with aspects of the disclosure.

The technology relates to an optical phased array (OPA) architecture for a wireless optical communication terminal that performs wavefront sensing. The architecture design may enable real-time wavefront measurements, angle of arrival measurements, and high transmit power with low power received signals. The wavefront measurements may be lossless. In addition, the architecture design for a single OPA is able to perform simultaneous transmit and receive functions.

The OPA architecture may include a micro-lens array, an emitter associated with each micro-lens, a plurality of phase shifters, and waveguides that connect the components in the OPA. The OPA architecture may be positioned on a single chip, an OPA chip. The waveguides progressively merge between the emitters and an edge coupler that connect to other transmitter and/or receiver components. In particular, the waveguide configuration may combine two waveguides at each stage, which means the number of waveguides is reduced by a factor of two at every successive stage closer to the edge coupler. The point of combination may be a node, and a combiner may be at each node. The combiner may be a 2×2 multimode interference (MMI) or directional coupler.

The micro-lens array may be configured with convex lenses that focus light onto the emitters to increase the effective fill factor. In some implementations, the emitters may be grating emitters. Each micro-lens in the array is shaped to remove the side lobes in a signal for the inverse transit beam as well as the receiver angular acceptance. Each micro-lens is typically 10's to 100's of micrometers in diameter and height. In addition, each micro-lens may be manufactured by molding, printing, or etching a lens directly into the wafer. Integrating a micro-lens array allows reduction of the grating emitter size and increase of the pitch between emitters. In this way, the two-dimensional waveguide routing in this architecture may better fit in a single layer optical phased array.

The emitters may be configured to generate a specific phase and intensity profile to further increase the effective fill factor and improve the wavefront. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the gaussian intensity profile of traditional grating emitters.

At least some components of the OPA architecture may be placed in Silicon Nitride (SiN) to support higher power in a transmit signal. SiN has a higher optical power nonlinear threshold than traditionally utilized Silicon on Insulator (SOI). SiN is compatible with standard foundry processes and offers low attenuation for wavelengths between visible and infrared. Due to its larger bandgap, SiN does not get affected by the two-photon absorption that limits the max power of silicon. This architecture enables injecting multi-watt transmit powers into the OPA chip, which is then funneled through the waveguide configuration. As the transmit signal branches out in the waveguide configuration towards the emitters, the power in each branch of the stage closest to the emitters may reduce below the two-photon absorption limit of SOI. The branches of the transmit signal may adiabatically couple into the emitters in a SOI layer. In some implementations, a portion of the waveguide configuration may also be placed in a SOI layer.

At some of the nodes, the combiner at each node of a receive path for an incoming optical beam, such that there are two input ports and two output ports at each node. A first output may be directed towards a photodetector, and a second output may be directed towards a next node of the receive path or other receiver components. The number of combiners with photodetectors can be selected based on the algorithm for any number between a single photodetector at a final combined signal at the edge coupler and a photodetector at each node along the waveguide tree. The first output may transmit out-of-phase portions of the incoming optical beam, or a first portion, and the second output may transmit in-phase portions of the incoming optical beam, or a second portion. Therefore, if there is no light coming out of one of the ports, it can be determined that all the light from the incoming beam is being output from the other port.

The photodetector may be configured to measure an amount of light in the first portion of the incoming optical beam that is received from the first output. The amount of light in the first output port may include partial light from the first input port and partial light from the second input port. For example, the amount of light may include a first optical beam that is a scaled value of the signal in the first input port and a second optical beam that is a scaled and 90-degree phase-shifted value of the signal in the second input port. Measuring the amount of light may include generating a first signal along a first axis of the photodetector and a second signal along a second axis of the photodetector at a 90-degree phase shift of the first axis. For example, the first signal may be generated based on the first optical beam, and the second signal may be generated based on the second optical beam. An amplitude of the generated first signal and an amplitude of the generated second signal may be summed together to determine a magnitude or intensity of the first portion. For example, the amplitude-square of the sum of the first and second signals may be measured by the photodetector.

The measured amplitude or intensity may be output from the photodetector for determining the relative phase difference between the two input light signals that is then used for the calculations for wavefront and input angle of arrival. This measurement and calculation introduce little to no additional loss. Based on the determined relative phase difference, the phase shifters may be adjusted to reduce the light measured in the first portion of the incoming beam in the first output. The lower the amount of light in the first output port, the higher the amount of light coupling to the second output port, which is connected to a next node of the receive path or other receiver components.

A transmit signal and a receive signal used by the terminal may be configured to have a frequency separation. The frequency separation improves the isolation between transmitted and received signals that may be traveling through the terminal simultaneously and through free space. Because the waveguides for transmit and receive signals can be identical and the pathlength within the waveguide tree can be designed to be nearly identical, the frequency separation may be selected to be as large as possible while ensuring that the components of the terminal will have the same effect on both signals. In some examples, optical separation may also be provided by a circulator. In some further examples, optical separation may also be provided by using one waveguide for the transmit path and another waveguide for the receive path along portions in the terminal, such as between the circulator and a light source or a sensor. There may also be a filter, such as at or near the circulator, that further increases isolation between the transmit signal and the receive signal. In one example, the frequency separation may be about 100 GHz or more.

Overall, the design of this OPA for an optical communication terminal may allow for faster and more accurate alignment adjustments, which may increase the amount of light transmitted along an optical link. The materials and design of the OPA may also be configured to transmit at a high power and detect low power received signals. The OPA architecture may also reduce the complexity, components, and cost for manufacturing the optical communication terminal. The reduction in complexity and components may also reduce errors or wear and increase longevity of the system.

EXAMPLE SYSTEMS

Figure 2A:
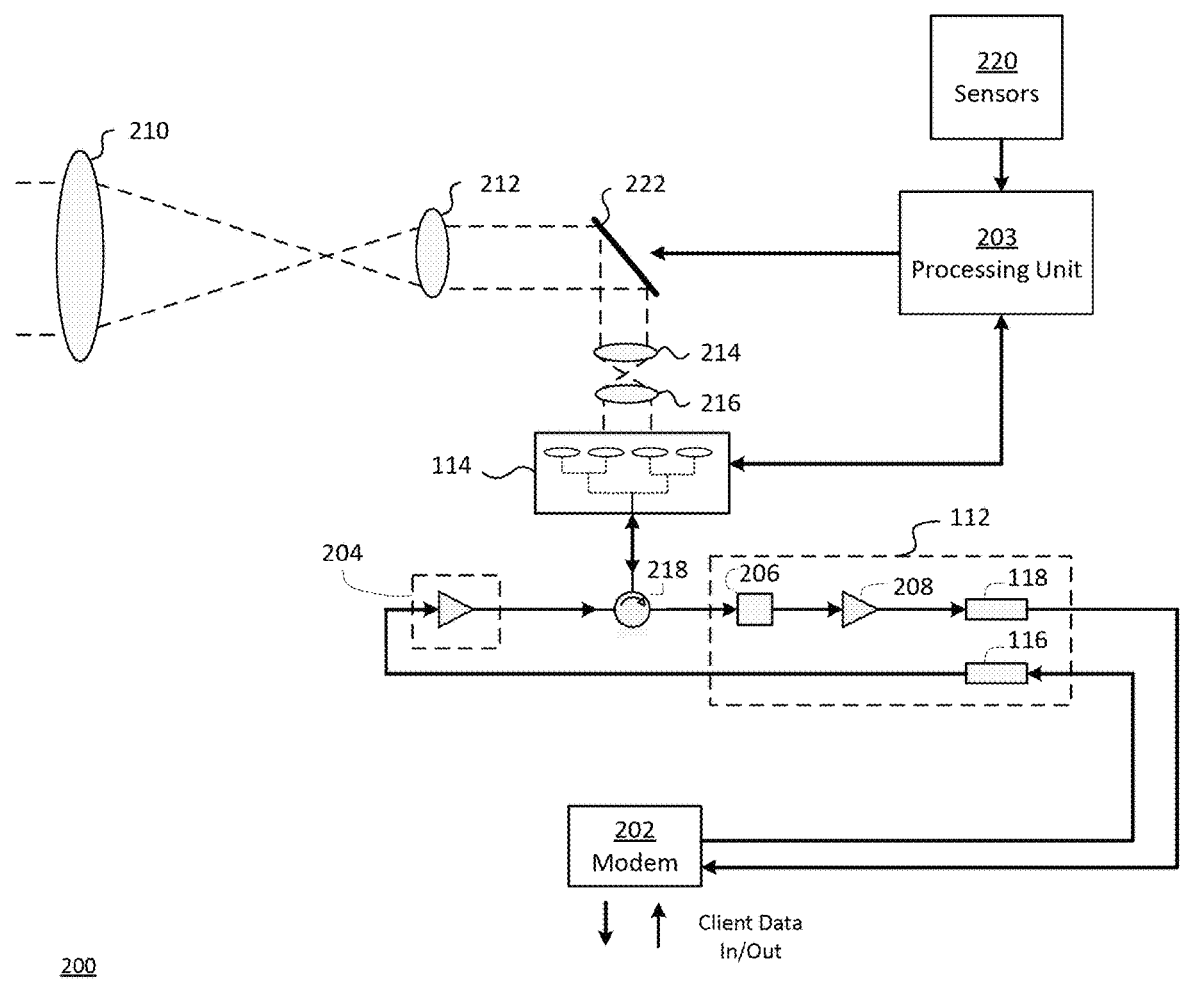
FIG. 2A is a pictorial diagram of a phase shifter architecture in accordance with aspects of the disclosure.
Figure 2B:
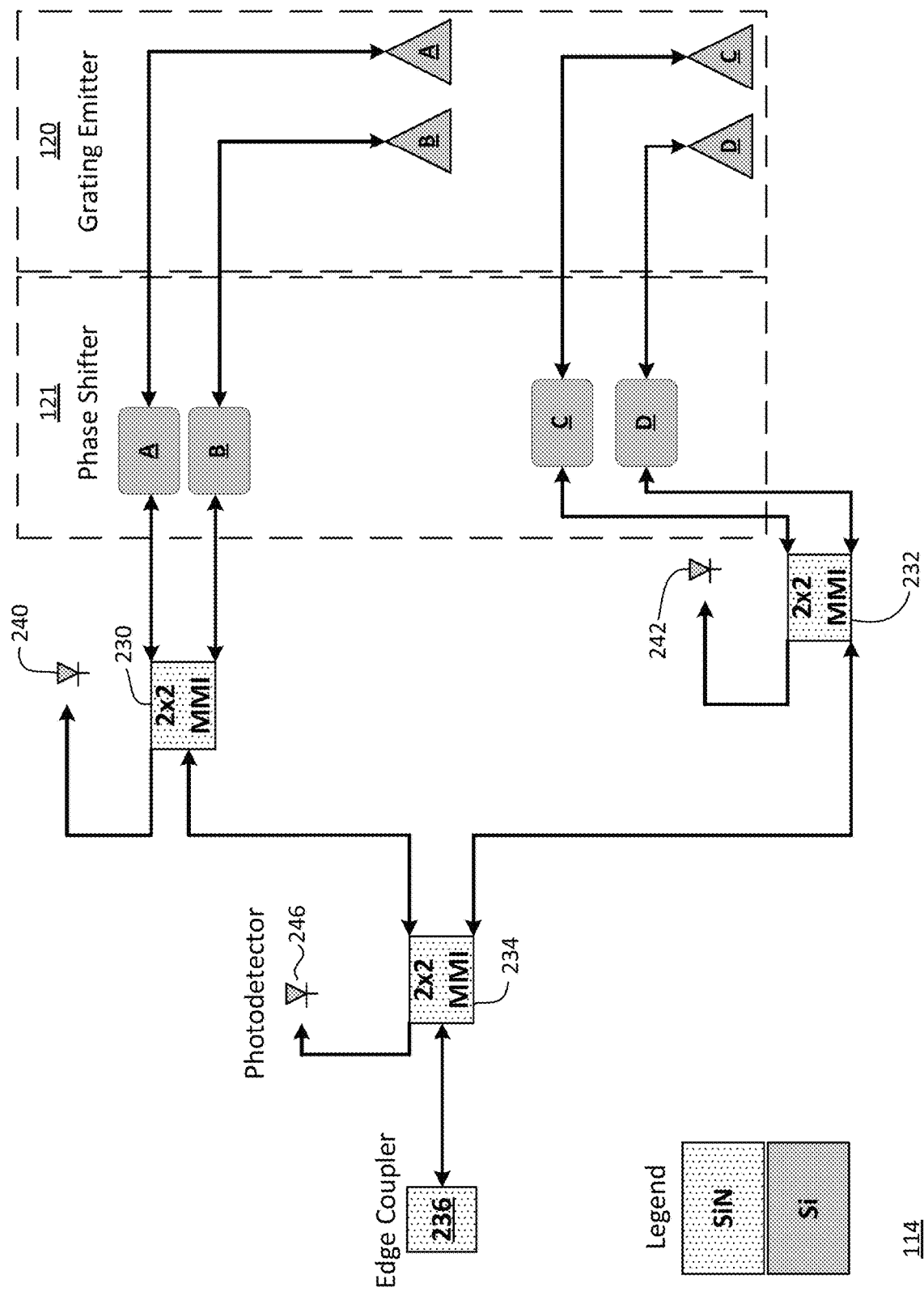
FIG. 2B is a pictorial diagram of an optical phased array architecture in accordance with aspects of the disclosure.

FIG. 1 is a block diagram 100 of a first communication device of a first communication terminal configured to form one or more links with a second communication device of a second communication terminal, for instance as part of a system such as a free-space optical communication (FSOC) system. FIGS. 2A-2B are pictorial diagrams of an example system architecture for the first communication device in FIG. 1. For example, a first communication device 102 includes one or more processors 104, a memory 106, a transceiver 112, and an optical phased array (OPA) photonic integrated chip 114. In some implementations, the transceiver 112 may be a photonic integrated chip. The first communication device 102 may include more than one transceiver chip and/or more than one OPA chip.

The one or more processors 104 may be any conventional processor(s), such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, such as in a modem 202 for digital signal processing shown in FIG. 2A, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information, such as one or more offsets determined for tracking a signal, may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps composed of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver 112. The transceiver 112 may comprise transmitter components and receiver components on one or more photonic integrated chips. As shown in FIG. 2A, the one or more processors in the modem 202 may be in communication with a transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include at minimum a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), light-emitting diode (LED), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA chip 114.

The receiver components may include at minimum a sensor 118, such as a photodiode. The sensor may convert the received light, or optical signal, into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the optical phased array chip 114. The OPA chip 114 receives light from the transmitter components and outputs the light as a coherent communication beam to be received by a remote communication device, such as second communication device 122. The OPA chip 114 also receives light from free space, such as a communication beam from second communication device 122, and provides it to the receiver components.

The OPA chip 114 may include a plurality of array elements 120, or emitters, and a plurality of phase shifters 121. A plurality of micro-lenses may be positioned over the plurality of array elements 120 to focus incoming light and collimate outgoing light. Each micro-lens in the array may be a convex lens that focuses light onto a corresponding emitter. In addition, each micro-lens may be shaped to remove the side lobes in a transmitted or received optical beam. Each micro-lens has a diameter and height on the order of tens or hundreds of micrometers. The plurality of array elements 120 may be arranged in a grid pattern with a consistent pitch, or distance, between adjacent elements. In some examples, the plurality of array elements 120 may be a grating emitter having the grid pattern. By way of example, the grid pattern may be a 32×32 grid that has a 100 micron pitch. In other examples, the array elements 120 may be in different arrangements having different numbers of rows and columns, different shapes, and/or different pitch (consistent or inconsistent). The phase shifters 121 alter the incoming and outgoing light at the array elements 120. The incoming light is provided to the receiver components, and the outgoing light is provided to the array elements 120. As shown in FIG. 2B, the architecture for the plurality of phase shifters 121 includes at least one layer of phase shifters. A first layer of phase shifters may include one phase shifter connected to each array element in the plurality of array elements 120. For the 32×32 grid of array elements, there are 1,024 phase shifters. In some examples, the phase shifter architecture includes a plurality of layers of phase shifters, where phase shifters in a first layer may be connected in series with one or more phase shifters in a second layer.

The OPA chip may also include one or more combiners that narrow the incoming optical beam and direct an outgoing optical beam to each array element and an edge coupler that couples the incoming optical beam between the OPA chip and a single-mode waveguide. The single mode waveguide may then direct the beam towards the transceiver 112. When the grid pattern of the plurality of array elements 120 is a 32×32 grid, there are 1,024 incoming beam portions that are merged into a single output beam. The incoming beam portions may be combined by a factor of two, or in an H tree, or in greater numbers until the single output beam is formed. When using the H tree configuration, there are ten (10) layers of combiners, where the layers include the following number of combiners starting from closest to the array elements ending at closest to the edge coupler: 512, 256, 128, 64, 32, 16, 8, 4, 2, and 1.

The one or more combiners may be a 2×2 MMI or a directional coupler. A given combiner may receive two incoming beam portions at a first input and a second input and merge the beams into an output beam, and direct a portion of the output beam out from an output to an input of another combiner or the edge coupler. For at least some of the one or more combiners, part of the output beam may be directed to a photodetector from a separate output of such a combiner or redirected from the output beam. The photo-detector may include a photodiode, photoresistor, phototransistor, or other type of light intensity sensor.

FIG. 2B shows a sample portion of the OPA architecture according to the features described herein. For example, the OPA chip 114 may include emitters 120A, 120B, 120C, 120D, phase shifters 121A, 121B, 121C, 121D, 2×2 MMIs 230, 232, 234, and edge coupler 236. Emitter 120A is connected to phase shifter 121A; emitter 120B is connected to phase shifter 121B; emitter 120C is connected to phase shifter 121C; and emitter 120D is connected to phase shifter 121D. The architecture depicted in FIG. 2B may be extrapolated or expanded for an architecture that has more emitters, phase shifters, and combiners. For example, the OPA chip may include additional layers of nodes that may also include combiners, the last layer of which may connect with the plurality of phase shifters 121.

In the portion depicted in FIG. 2B, a first input of combiner 230 may be connected to phase shifter 121A; a second input of combiner 230 may be connected to phase shifter 121B; a third input of combiner 232 may be connected to phase shifter 121C; and a fourth input of combiner 232 may be connected to phase shifter 121D. Combiner 230 may include a first output to a photodetector 240 and a second output to combiner 234, and combiner 232 may include a third output to a photodetector 242 and a fourth output to combiner 234. The combiner 234 may include a fifth input connected to the second output of combiner 230, a sixth input connected to the fourth output of combiner 232, a fifth output connected to photodetector 246, and a sixth output connected to edge coupler 236. In other implementations, only combiner 234 may have two outputs and one of the outputs connected to a photodetector, while combiners 230, 232 only have one output connected to the combiner 234. The edge coupler 236 may direct the combined incoming optical beams into a single mode waveguide that leads other receiver components. In some examples, the single mode waveguide leads to a circulator that provides isolation of the incoming light from any outgoing light.

For the combiners connected to the photodetectors, a first portion of the output beam that is out-of-phase may be directed out a first output towards a photodetector, and a second portion of the output beam that is in-phase may be directed out a second output towards another combiner or the edge coupler. The photodetectors may be configured to sense a magnitude of received light, such as the first portion of the output beam, and provide a signal to the one or more processors 104 of the communication device 102 that indicates the magnitude of the received light. In this way the sensed magnitude may be used by the one or more processors to generate and provide an angle of arrival estimate to the one or more processors 104, such as those in processing unit 203.

Components in the OPA chip may be arranged on a combination of Silicon (Si), such as Silicon on Insulator (SOI), and Silicon Nitride (SiN). A first set of components including and closer to the edge coupler may be arranged on SiN, while a second set of components including and closer to the plurality of array elements may be arranged on Si. As shown in FIG. 2B, the edge coupler 236 and combiners 230, 232, 234 may be arranged on SiN, as indicated by the stippling shading. The plurality of array elements 120 and the plurality of phase shifters 121 may be arranged on Si, as indicated by the non-stippled fill.

The system may include additional components to support functions of the communication terminal. For example, the system may include one or more lenses and/or mirrors that form a telescope. The telescope may receive collimated light and output collimated light. The telescope may include an objective portion, an eyepiece portion, or a relay portion. As shown in FIG. 2A, the system may include an objective lens 210, an eyepiece lens 212, and relay lenses 214, 216. The system may include a circulator, such as a single mode circulator 218, that routes incoming light and outgoing light while keeping them on at least partially separate paths. The system may include one or more sensors 220 for detecting measurements of environmental features and/or system components. The system may include one or more steering mechanisms, such as one or more bias means for controlling one or more phase shifters, which may be part of the OPA chip 114, and/or an actuated/steering mirror 222, such as a fast/fine pointing mirror. In some examples, the actuated mirror may be a MEMS 2-axis mirror, 2-axis voice coil mirror, or a piezoelectric 2-axis mirror. The one or more processors 104, such as those in the processing unit 203, may be configured to receive and process signals from the one or more sensors 220, the transceiver 112, and/or the OPA chip 114 and to control the one or more steering mechanisms to adjust a pointing direction and/or wavefront shape, described in more detail below. The system also includes optical fibers, or waveguides, connecting optical components, creating a path between the seed laser 116 and OPA chip 114 and a path between the OPA chip 114 and the photodiode 118.

As shown in FIG. 1, the first communication device 102 may output an optical beam 20a pointed towards a second communication device 122.

Similarly, the second communication device 122 includes one or more processors, 124, a memory 126, a transceiver 132, and an OPA chip 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver 132 and the OPA chip 134 of the second communication device 122 may be similar to the transceiver 112 and the OPA chip 114. The transceiver 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA chip 114 may include a plurality of array elements 140 and a plurality of phase shifters 141, which may be similar to array elements 120 and phase shifters 121, respectively. Additional components for supporting functions of the communication device 122 may be included similar to the additional components described above. The communication device 122 may have a system architecture that is same or similar to the system architecture shown in FIG. 2.

As shown in FIG. 1, the second communication device 122 may output an optical beam 20b pointed towards the first communication device 102, which receives the optical beam 20b.

As shown in FIG. 1, the communication link 22 may be formed between the first communication device 102 and the second communication device 122 when the transceivers of the first and second communication devices are aligned. The alignment can be determined using the optical beams 20a, 20b to determine when line-of-sight is established between the communication devices 102, 122. Using the communication link 22, the one or more processors 104 can send communication signals using the optical beam 20a to the second communication device 122 through free space, and the one or more processors 124 can send communication signals using the optical beam 20b to the first communication device 102 through free space. The communication link 22 between the first and second communication devices 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

Figure 3:
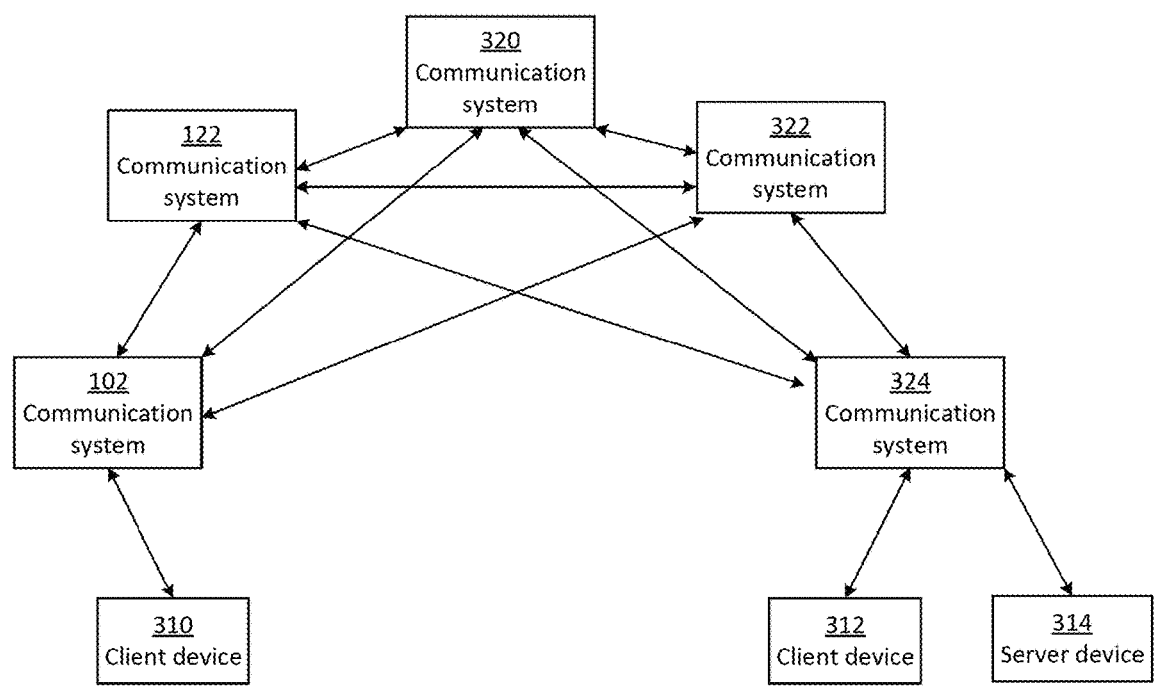
FIG. 3 is a pictorial diagram of a network in accordance with aspects of the disclosure.

As shown in FIG. 3, a plurality of communication devices, such as the first communication device 102 and the second communication device 122, may be configured to form a plurality of communication links (illustrated as arrows) between a plurality of communication terminals, thereby forming a network 200. The network 300 may include client devices 310 and 312, server device 314, and communication devices 102, 122, 320, 322, and 324. Each of the client devices 310, 312, server device 314, and communication devices 320, 322, and 324 may include one or more processors, a memory, a transceiver, an OPA chip similar to those described above. Using the transmitter and the receiver, each communication device in network 300 may form at least one communication link with another communication device, as shown by the arrows. The communication links may be for optical frequencies, radio frequencies, other frequencies, or a combination of different frequency bands. In FIG. 3, the communication device 102 is shown having communication links with client device 310 and communication devices 122, 320, and 322. The communication device 122 is shown having communication links with communication devices 102, 320, 322, and 324.

The network 300 as shown in FIG. 3 is illustrative only, and in some implementations the network 300 may include additional or different communication terminals. The network 300 may be a terrestrial network where the plurality of communication devices is on a plurality of ground communication terminals. In other implementations, the network 300 may include one or more high-altitude platforms (HAPs), which may be balloons, blimps or other dirigibles, airplanes, unmanned aerial vehicles (UAVs), satellites, or any other form of high-altitude platform, or other types of moveable or stationary communication terminals. In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network.

EXAMPLE METHODS

Figure 4:
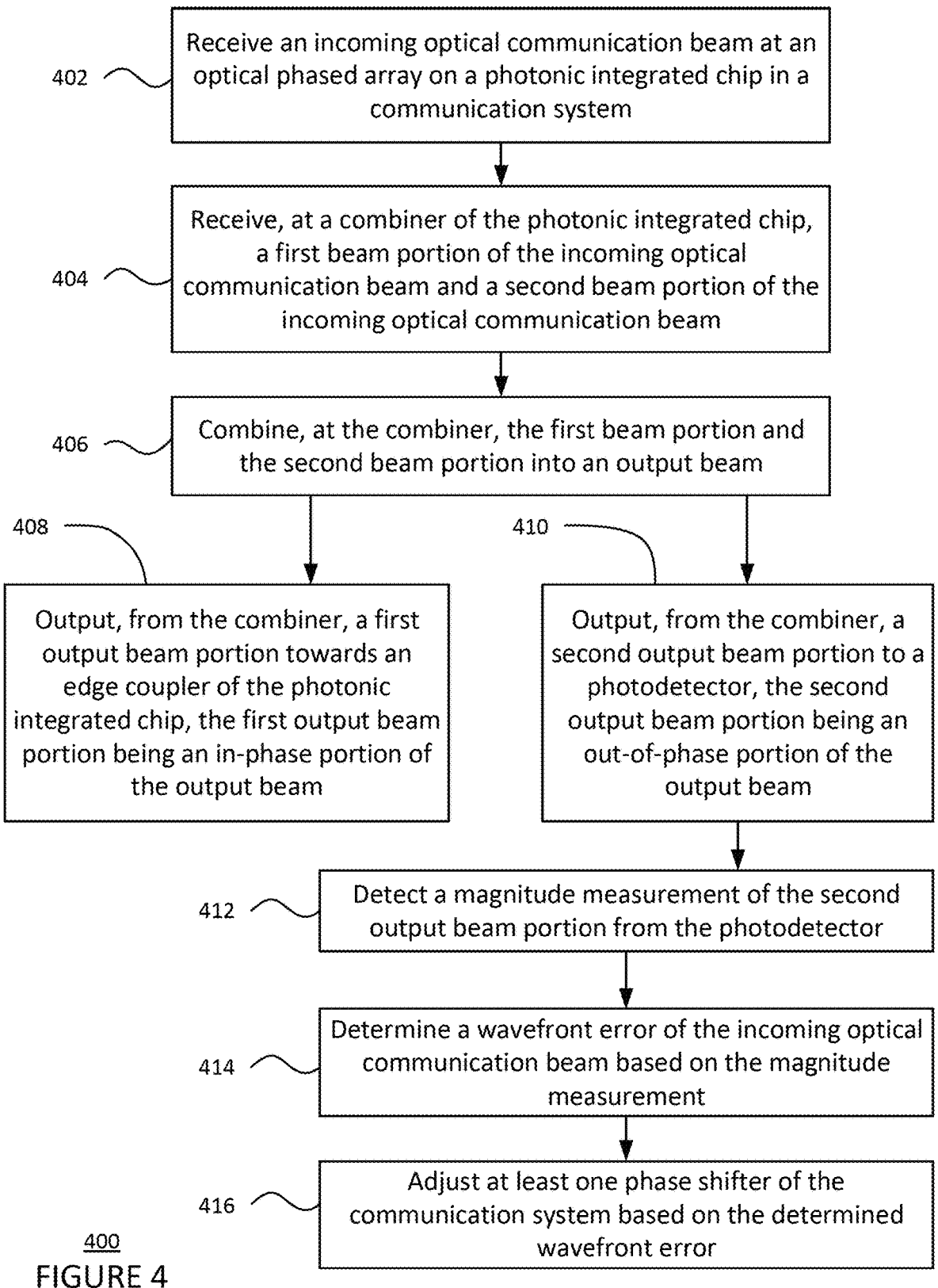
FIG. 4 is a flow diagram in accordance with aspects of the disclosure.

In operation, the one or more processors 104 may perform wavefront sensing and/or correction for optical communication. In FIG. 4, flow diagram 400 is shown in accordance with some of the aspects described above that may be performed by the one or more processors 104 of the first communication device 102. Additionally or alternatively, the one or more processors 124 of the second communication device 122 may perform one or more steps of the flow diagram 400. While FIG. 4 shows blocks in a particular order, the order may be varied and that multiple operations may be performed simultaneously. Also, operations may be added or omitted.

At block 402, an incoming optical communication beam may be received at an optical phased array on a photonic integrated chip in a communication system. The incoming optical communication beam may carry data from a remote communication system or a client device. The incoming optical communication beam may be received at a plurality of array elements of the optical phased array. Each beam portion received at a given array element may be directed through a phase shifter of a plurality of phase shifters. The beam portions are coupled to a waveguide, which directs the collected beam portions to receiver components of the communication system to be processed. The data may be processed and/or transmitted to a next hop in a network. For example, the optical beam 20b may be received at the array elements 120 in OPA chip 114 of communication device 102. The optical beam 20b may be directed through the phase shifters 121 at OPA chip 114 towards a single mode waveguide, which directs the optical beam to receiver components such as sensor 118.

At block 404, a first beam portion of the incoming optical communication beam and a second beam portion of the incoming optical communication beam may be received at a combiner of the photonic integrated chip. The combiner may have two inputs and two outputs. For example, the combiner may be a 2×2 MMI, such as one or more of the combiners 230, 232, 234 of OPA 114. The first beam portion may be received at a first input of the combiner, and the second beam portion may be received at a second input of the combiner. Using combiner 230 in FIG. 2B as an example, the first beam portion may be received from array element 120A via phase shifter 121A, and the second beam portion may be received from array element 120B via phase shifter 121B. At block 406, the first beam portion and the second beam portion may be combined at the combiner into an output beam.

At block 408, a first output beam portion may be output from the combiner towards an edge coupler of the photonic integrated chip. The first output beam portion may be an in-phase portion of the output beam. At block 410, a second output beam portion may be output from the combiner to a photodetector. The second output beam portion may be an out-of-phase portion of the output beam. For example, the out-of-phase portion may include a scaled value of the first beam portion from the first input and a scaled and 90-degree phase-shifted value of the second beam portion from the second input. In the example using combiner 230, the first output beam portion may be transmitted from a first output to combiner 234, and the second output beam may be transmitted from a second output to photodetector 240.

At block 412, a measurement of the second output beam portion from the photodetector may be detected by one or more processors of the communication system. The photodetector may be configured to detect a magnitude or intensity by generating a first signal along a first axis of the photodetector and a second signal along a second axis of the photodetector at a 90-degree phase shift of the first axis. For example, the first signal may be based on the scaled value of the first beam portion, and the second signal may be based on the scaled and 90-degree phase-shifted value of the second beam portion. An amplitude of the generated first signal and an amplitude of the generated second signal may be summed together to determine the magnitude or intensity of the first portion. For example, the measurement of the second output beam portion from the photodetector may be an amplitude-square of the sum of the first and second signals. The measurement may be output from the photodetector for determining the relative phase difference that is then used for the calculations for wavefront and input angle of arrival. For example, the one or more processors 104 of communication device 102 may detect a magnitude or intensity measurement of the second output beam portion from the photodetector 240.

At block 414, a wavefront error of the incoming optical communication beam may be determined by the one or more processors based on the magnitude or intensity measurement. In some implementations, determining the wavefront error may include determining a relative phase difference and/or input angle of arrival based on the magnitude or intensity measurement. The terms determined for the input angle of arrival may include a combination of tip, tilt, or higher order terms. The one or more processors may determine the wavefront error based on the relative phase difference and/or the input angle of arrival. For example, the one or more processors 104 may determine a wavefront error of the optical beam 20b based on the magnitude or intensity measurement from the photodetector 240.

At block 416, at least one phase shifter of the communication system may be adjusted by the one or more processors based on the determined wavefront error. Adjustment of the at least one phase shifter may be performed in order to achieve improved coupling of the incoming optical communication beam at the OPA chip, which may also improve coupling of an outgoing optical communication beam at a remote communication system. The improved coupling at the OPA chip may cause the in-phase portion of an output beam at a given combiner to increase while causing the out-of-phase portion of the output beam to decrease at the given combiner. The blocks 412, 414, and 416 may be part of a feedback loop performed by the one or more processors that is repeated to minimize the power measured in the out-of-phase portion of the output beam. The feedback loop may include making phase shifter adjustments at each cycle. The closer the out-of-phase portion of the output beam is to zero intensity, the better the coupling is to the in-phase portion of the output beam, and thus to the rest of the receive path.

In other implementations, the one or more processors may additionally or alternatively adjust a wavefront or pointing direction based on the determined wavefront error. The wavefront and/or pointing direction may be adjusted mechanically and/or electronically. The mechanical steering may include controlling an angle of a secondary steering element, such as an actuated mirror. The electronic steering may include controlling the plurality of phase shifters, such as by setting phase shift settings for each phase shifter. In some implementations, steering the secondary steering element may be used for larger-scale, low frequency adjustments, and steering using the plurality of phase shifters may be for smaller-scale, high frequency adjustments. For example, the one or more processors 104 may adjust a wavefront and/or pointing direction of the communication device 102 based on the determined wavefront error. The mechanical steering may include controlling the steering mirror 222. The electronic steering may include controlling the plurality of phase shifters 121.

Once the at least one phase shifter is adjusted, an outgoing optical communication beam may be transmitted using the photonic integrated chip and the at least one adjusted phase shifter. For example, the one or more processors 104 may transmit an optical beam 20a using the array elements 120 and the phase shifters 121 of the OPA chip 114. In some implementations, a first set of processors may perform the detecting of the magnitude or intensity measurement, the determining of the wavefront error, and the adjusting of the at least one phase shifter, while a second set of processors may perform the transmitting of the outgoing optical communication beam. The first set of processors may perform the steps in a feedback loop that may be used to track changes in the incoming optical communication beam. Changes may include position changes, such as drift, fading or scintillation, or other types of changes.

The features described herein may provide a more cost-effective and accurate communication system by implementing integrated photonic chips. The single path transmit-receive design of this system mode system allows for use of less complex and less expensive components. In addition, the design also reduces error in alignment between communication devices. The design may also reduce error by replacing a boresight requirement between the tracking and communication beams with a feedback loop that is connected directly to the communication beam, and not a diverted beam.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An optical phased array (OPA) photonic integrated chip comprising:
    a plurality of array elements;
    a plurality of phase shifters including a layer of phase shifters that has a phase shifter connected to each array element in the plurality of array elements;
    a plurality of combiners that is configured to connect the plurality of phase shifters to an edge coupler for a single mode waveguide, the plurality of combiners including a first combiner that has:
        a first output that is connected to a second combiner or the edge coupler, and
        a second output of the first combiner is connected to a photodetector,
        wherein an in-phase light portion at the first combiner is output through the first output, and an out-of-phase light portion at the first combiner is output through the second output; and
    the edge coupler configured to couple to the single mode waveguide.

2. The OPA chip of claim 1, wherein the plurality of array elements includes a grating emitter.

3. The OPA chip of claim 1, wherein the plurality of array elements is arranged in a 32×32 grid of array elements.

4. The OPA chip of claim 1, wherein the plurality of combiners includes at least one 2×2 multimode interferometer (MMI).

5. The OPA chip of claim 1, wherein the plurality of combiners includes at least one directional coupler.

6. The OPA chip of claim 1, wherein the plurality of combiners is arranged in an H tree configuration.

7. The OPA chip of claim 1, wherein the plurality of combiners includes more than one combiner that has an output connected to a photodetector.

8. The OPA chip of claim 1, wherein the plurality of array elements and the plurality of phase shifters are arranged in silicon, and the edge coupler is arranged in silicon nitride.

9. The OPA chip of claim 8, wherein a first set of the plurality of combiners is arranged in silicon, and a second set of the plurality of combiners is arranged in silicon nitride.

10. The OPA chip of claim 1, further comprising a micro-lens array arranged between the plurality of array elements and an edge of the OPA chip.

11. An optical communication system including the OPA chip of claim 1.

12. The system of claim 11, further comprising one or more processors configured to transmit a first optical signal via the OPA chip and receive a second optical signal via the OPA chip.

13. The system of claim 12, wherein the one or more processors are configured to:
    receive a signal from the photodetector;
    determine an adjustment to at least one phase shifter of the plurality of phase shifters in order to increase an amount of incoming light coupled to the OPA chip; and
    send instructions to the at least one phase shifter to perform the adjustment.

14. The system of claim 12, wherein the first optical signal and the second optical signal have a wavelength separation equal to or larger than 100 GHz.

15. A method for performing wavefront correction for optical communication, the method comprising:
    receiving, at an optical phased array on a photonic integrated chip in a communication system, an incoming optical communication beam;
    receiving, at a combiner of the photonic integrated chip, a first beam portion of the incoming optical communication beam and a second beam portion of the incoming optical communication beam;
    combining, at the combiner, the first beam portion and the second beam portion into an output beam;
    outputting, from the combiner, a first output beam portion towards an edge coupler of the photonic integrated chip, the first output beam portion being an in-phase portion of the output beam;
    outputting, from the combiner, a second output beam portion to a photodetector, the second output beam portion being an out-of-phase portion of the output beam;
    detecting, by one or more processors of the communication system, a measurement of the second output beam portion from the photodetector;
    determining, by the one or more processors, a wavefront error of the incoming optical communication beam based on the measurement; and
    adjusting, by the one or more processors, at least one phase shifter of the communication system based on the determined wavefront error.

16. The method of claim 15, wherein the determining of the wavefront error includes determining a relative phase difference based on the measurement.

17. The method of claim 15, further comprising transmitting, by the one or more processors, an outgoing optical communication beam using the photonic integrated chip and the adjusted at least one phase shifter.

18. The method of claim 17, wherein the detecting of the measurement, the determining of the wavefront error, and the adjusting of the at least one phase shifter comprise a feedback loop.

19. The method of claim 18, further comprising tracking, using the feedback loop, changes of the incoming optical communication beam.

20. The method of claim 15, wherein the adjusting of the at least one phase shifter includes increasing the in-phase portion of the output beam and decreasing the out-of-phase portion of the output beam at the combiner.

* * * * *